US009741143B2

(12) United States Patent
Senda et al.

(10) Patent No.: US 9,741,143 B2
(45) Date of Patent: Aug. 22, 2017

(54) MULTOCULAR IMAGING SYSTEM, SYNTHESIS PROCESS METHOD OF ACQUIRED IMAGES, AND PROGRAM

(71) Applicants: NEC Corporation, Tokyo (JP); Tokyo Institute of Technology, Tokyo (JP)

(72) Inventors: Shuji Senda, Tokyo (JP); Akihiko Iketani, Tokyo (JP); Takashi Shibata, Tokyo (JP); Masatoshi Okutomi, Tokyo (JP); Masayuki Tanaka, Tokyo (JP)

(73) Assignees: NEC Corporation, Tokyo (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 14/893,484

(22) PCT Filed: Apr. 22, 2014

(86) PCT No.: PCT/JP2014/061927
§ 371 (c)(1),
(2) Date: Nov. 23, 2015

(87) PCT Pub. No.: WO2014/192487
PCT Pub. Date: Dec. 4, 2014

(65) Prior Publication Data
US 2016/0098852 A1   Apr. 7, 2016

(30) Foreign Application Priority Data
May 29, 2013   (JP) ................................. 2013-112453

(51) Int. Cl.
*G06K 9/46* (2006.01)
*G06T 11/60* (2006.01)
(Continued)

(52) U.S. Cl.
CPC ................ *G06T 11/60* (2013.01); *G06K 9/46* (2013.01); *G06K 9/6215* (2013.01); *H04N 5/247* (2013.01);
(Continued)

(58) Field of Classification Search
CPC ........... G06T 11/60; G06T 2207/20021; G06T 2207/20024; G06T 2200/28;
(Continued)

(56) References Cited

U.S. PATENT DOCUMENTS

2003/0072483 A1   4/2003 Chen
2006/0078197 A1   4/2006 Mitsumoto et al.
(Continued)

FOREIGN PATENT DOCUMENTS

EP   1286307 A2   2/2003
EP   2096603 A1   9/2009
(Continued)

OTHER PUBLICATIONS

International Search Report corresponding to PCT/JP2014/061927 mailed Jul. 22, 2014 (5 pages).
(Continued)

*Primary Examiner* — Ali Bayat
(74) *Attorney, Agent, or Firm* — Wilmer Cutler Pickering Hale and Dorr LLP

(57) ABSTRACT

A basis image is converted into a more functional image by image synthesis technology using a number of imaging devices arranged independently of each other. A multocular imaging system is provided with a plurality of imaging parts that can be arranged independently of each other, a similar component search part operable to acquire a basis image outputted from at least one imaging part of the plurality of imaging parts and a reference image outputted from another imaging part of the plurality of imaging parts and to search a similar component included in the reference image for each of components included in the basis image, and an image synthesis part operable to perform a synthesis process on at least one component included in the basis image into a desired image with reference to the similar component
(Continued)

extracted by the similar component search part and to output the desired image as a synthesis image.

15 Claims, 9 Drawing Sheets

(51) Int. Cl.
*H04N 5/247* (2006.01)
*H04N 5/262* (2006.01)
*G06K 9/62* (2006.01)
*G06K 9/00* (2006.01)

(52) U.S. Cl.
CPC ......... *H04N 5/262* (2013.01); *G06K 9/00677* (2013.01); *G06K 9/00771* (2013.01); *G06K 9/6293* (2013.01); *G06K 2009/4666* (2013.01); *G06T 2200/28* (2013.01); *G06T 2207/20021* (2013.01); *G06T 2207/20024* (2013.01)

(58) Field of Classification Search
CPC .................. G06K 9/6215; G06K 9/46; G06K 2009/4666; A61B 2009/371; A61B 90/37
See application file for complete search history.

(56) References Cited

U.S. PATENT DOCUMENTS

| | | | |
|---|---|---|---|
| 2008/0080762 A1 | 4/2008 | Kawakami | |
| 2009/0214107 A1 | 8/2009 | Masuda | |
| 2012/0013713 A1* | 1/2012 | Sumitomo | B60R 1/00 348/46 |
| 2012/0170812 A1* | 7/2012 | Kamiyama | B60R 1/00 382/103 |
| 2014/0005484 A1* | 1/2014 | Charles | A61B 17/02 600/201 |
| 2015/0010247 A1* | 1/2015 | Tanaka | H04N 1/409 382/254 |
| 2016/0292883 A1* | 10/2016 | Comport | G06T 7/204 |

FOREIGN PATENT DOCUMENTS

| | | |
|---|---|---|
| JP | H07-336669 A | 12/1995 |
| JP | 2003-099760 A | 4/2003 |
| JP | 2006-105661 A | 4/2006 |
| JP | 2008-033818 A | 2/2008 |
| JP | 2008-090601 A | 4/2008 |
| JP | 2009-187316 A | 8/2009 |
| JP | 2009-205193 A | 9/2009 |
| JP | 2011-188277 A | 9/2011 |
| JP | 2012-029199 A | 2/2012 |
| JP | 2012-032217 A | 2/2012 |
| JP | 2012-073702 A | 4/2012 |
| JP | 2012-138771 A | 7/2012 |
| JP | 2012-222471 A | 11/2012 |
| JP | 2012-253706 A | 12/2012 |

OTHER PUBLICATIONS

PCT ISA 237 Written Opinion corresponding to PCT/JP2014/061927 mailed Jul. 22, 2014 (7 pages).

* cited by examiner

MULTOCULAR IMAGING SYSTEM, SYNTHESIS PROCESS METHOD OF ACQUIRED IMAGES, AND PROGRAM

CROSS-REFERENCE TO RELATED APPLICATIONS

This application is a national stage application of International Application No. PCT/JP2014/061927 entitled "Multocular Imaging System, Synthesis Process Method of Acquired Images, and Program" filed on Apr. 22, 2014, which claims priority to Japanese Application No. 2013-112453 filed on May 29, 2013, the disclosures of which are hereby incorporated by reference in their entirety.

TECHNICAL FIELD

The present invention relates to image processing technology, and more particularly to a multocular imaging system, an image synthesis method, and a program using images acquired from a plurality of imaging devices to produce a desired image output.

BACKGROUND ART

Higher-performance imaging devices have been studied along with recent development of the digital imaging technology. What will be required in the imaging technology is to record images more finely.

Common digital still cameras and digital video cameras employ imaging devices such as CMOSs or CCDs to produce still image files and video files as projected from human's viewpoint. The image resolution of those devices will be improved in the future.

Meanwhile, collection of functional information from image files along with images has been studied with regard to the digital imaging technology. Examples of this technology include obtaining a parallax to a focused object by associating two images with each other to synthesize a 3D image from a twin-lens camera. Additionally, effective methods of reproducing a parallax have also been studied.

According to various studies made in the past, increase of the number of lenses for a camera, integration of videos of multiple cameras, or continuous imaging of videos of a monocular camera was performed during an image acquisition process. Then the acquired images were subjected to image processing so as to show better images to human.

Some examples of the digital imaging technology related to the above include the following references.

Patent Literature 1 discloses image processing technology of calculating a parallax from two imaging devices of the same kind that are spaced at a certain interval and fixed relative to each other.

Patent Literature 2 discloses image processing technology of synthesizing a plurality of intermediate images from images acquired by a plurality of imaging devices and calculating a synthesis image based on the stationarity included in the image group of the synthesized intermediate images to thereby generate a virtual image from an intermediate viewpoint of the imaging devices.

Patent Literature 3 discloses image processing technology of acquiring multiple images at different points of time with a monocular camera that projects an object and removing noises mixed in the multiple images by referring to images at another point of time.

Patent Literature 4 discloses image processing technology of acquiring multiple images with different exposures at different points of time with a monocular camera that projects an object, leveling the exposure of the images having different exposures for comparison, and generating a desired HDR image by referring to an image that better captures the object.

Patent Literature 5 discloses image processing technology of acquiring 360°-panorama images at different points of time with a monocular 360°-panorama camera that projects an object, performing image correction on the individual images, and performing a super-resolution process with reference to differences between the individual images to generate a higher-resolution image.

Patent Literature 6 discloses technology of calculating a parallax from a sub-camera unit including two imaging devices of the same kind that are spaced at a certain interval and fixed relative to each other, calculating a distance to the object to be taken based on the calculated parallax, and performing a focusing process of a main camera.

In this manner, those references disclose technology of imaging monocular or multocular images (data) and conducing image processing so as to conform to a desired image for various application. Those references also disclose changing imaging conditions with reference to information on a distance to an object that has been acquired from multiple images.

PRIOR ART LITERATURE

Patent Literature

Patent Literature 1: JP-A 1995-336669
Patent Literature 2: JP-A 20124073702
Patent Literature 3: JP-A 2012-032217
Patent Literature 4: JP-A 2011-188277
Patent Literature 5: JP-A 2012-138771
Patent Literature 6: JP-A 2012-222471

SUMMARY OF THE INVENTION

Problem(s) to be Solved by the Invention

As described above, various approaches have been taken for the development of the digital imaging technology. Among others, an approach to use images acquired from multiple imaging devices to produce a desired image output will also work advantageously in the future. Examples of the advantages of this approach include readiness of obtaining various kinds of information to synthesize functional images that are better than obtained by the technology using images taken at different points of time (frames) with a monocular camera.

However, the image processing technology for images acquired by multiple imaging devices suffers from several problems.

One of those problems is exemplified as follows: Since images are acquired from different imaging devices, some processes are required to correct or complement differences of the imaging devices (between image-taken locations, between image-taking timings, between performances, between settings, or the like) so as to bring the images into the same condition. According to many prior art references, the relationship between multiple devices is clarified by fixing the same device to a predetermined location with high accuracy or by performing positional calibration upon production or in use. Then multiple images acquired from those multiple devices are subjected to a required image synthesis process.

In other words, desired images are acquired by multiple imaging devices and subjected to an image synthesis process after calibration has been performed between those imaging devices. Generally, such an image synthesis process requires more precise correction as the functionality is enhanced by increasing the resolution or rate of images or videos being acquired.

Another problem is exemplified as follows: Upon image synthesis of multiple images acquired by different imaging devices, there are a plurality of positional relationships (distance, light source, or the like) between positions of individual cameras (coordinates, angles, or the like) and a plurality of objects. According to the existing technology, such a problem is prevented by fixing the target to only one object, limiting the object distance to only an equivalent distance, or limiting the image-taking range to an interior of a predetermined space. Those limitations cause various inconveniences that limit the imaging.

Furthermore, use of a set of a multocular lens and a single imaging device can greatly reduce the necessity for correcting differences between devices. On the other hand, this method still has many disadvantages, which include an increase of the size of the imaging device, accuracy within the imaging device (difference in sensitivity between an interior and an exterior of the device or the like), adjustment of focal points of individual lenses, and the like.

An object of the present invention is to provide a multocular imaging system that converts a basis image into a more functional image by performing an image reinforcement on an image component included in each of images when required image synthesis is conducted with a plurality of imaging devices.

Means for Solving the Problem(s)

A multocular imaging system according to the present invention is characterized by comprising a plurality of imaging parts that can be arranged independently of each other a similar component search part operable to acquire a basis image outputted from at least one imaging part of the plurality of imaging parts and a reference image outputted from another imaging part of the plurality of imaging parts and to search a similar component included in the reference image for each of components included in the basis image; and an image synthesis part operable to perform a synthesis process on at least one component included in the basis image into a desired image with reference to the similar component extracted by the similar component search part and to output the desired image as a synthesis image.

Advantageous Effects of the Invention

According to the present invention, there can be provided a multocular imaging system that converts a basis image into a more functional image by performing an image reinforcement on an image component included in each of images when required image synthesis is conducted with a plurality of imaging devices.

MODE(S) FOR CARRYING OUT THE INVENTION

Each of the cameras 10 in the group is an imaging means (imaging unit) having an imaging device.

First Embodiment

Figure 1:
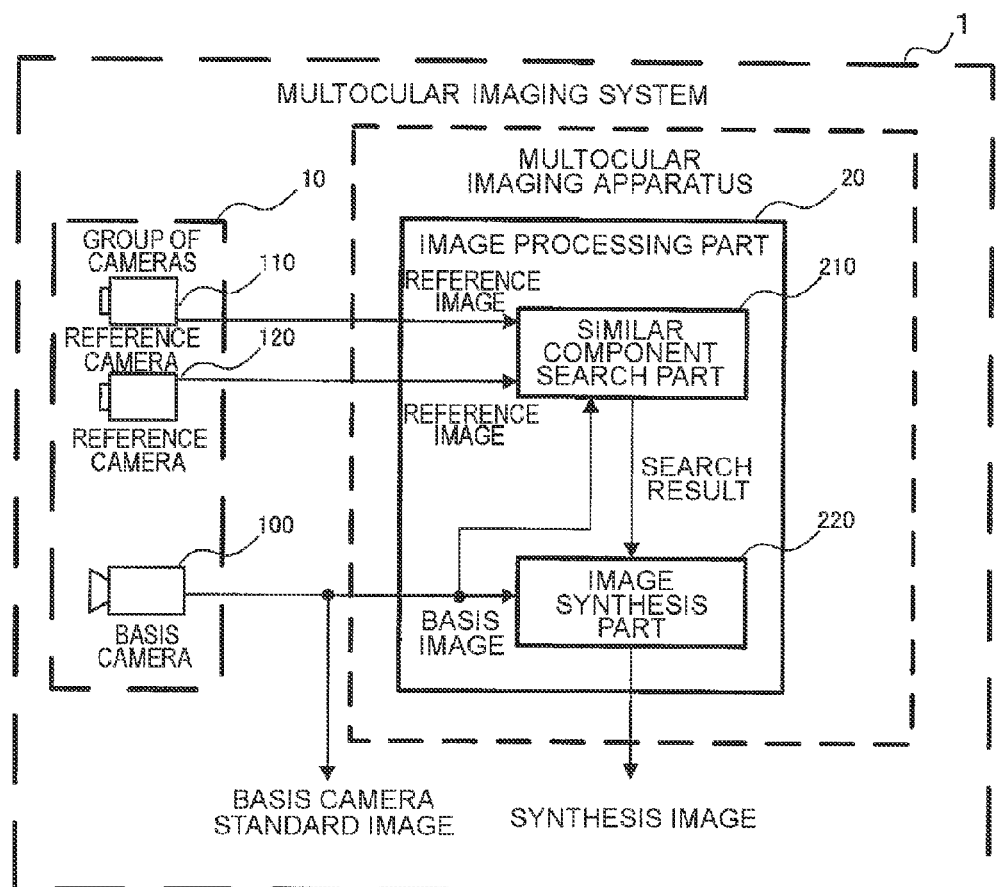
FIG. 1 is a configurational diagram showing a multocular imaging system according to a first embodiment of the present invention.

FIG. 1 is a configurational diagram showing a multocular imaging system 1 according to a first embodiment of the present invention.

The multocular imaging system 1 includes a group of cameras 10 and an image processing part 20 operable to conduct desired image processing on a plurality of images acquired by the group of cameras 10. The explanation of an input part (an operation panel and the like) and an output part (a display part, a composite interface, and the like) for taking images will be omitted herein.

Each of the cameras 10 in the group is an imaging means having an imaging device. Various imaging means may be selected for the group of cameras 10 depending upon desired images. Each of the cameras 10 in the group is independently arranged generally along the same direction. Strict correction of the position of the cameras is not required unlike the aforementioned prior art. The group of cameras 10 includes a basis camera 100 and reference cameras 110 and 120. The basis camera 100 and the reference cameras 110 and 120 output a basis image and a reference image, respectively. For example, when motion images taking, as a video, surface temperatures of some objects that have accurately been measured individually are acquired in real-time, a video camera and an infrared camera may be used. Furthermore, when a high resolution video that cannot be achieved by a monocular imaging device is desired, a video camera with a high resolution may be combined with one or more sub-cameras so as to acquire a super-resolution video. As illustrated, an image outputted from the basis camera 100 (basis image) may be outputted as a standard image. Furthermore, individual cameras may be configured to be operated in diaphragm or angle by the image processing part 20. Examples of camera devices for the group of cameras include a motion image camera, a still image camera, an infrared camera, a night-vision camera, a high-sensitivity monochrome camera, and the like. Furthermore, a camera combined with measurement sensor equipment, such as a sound camera and a radiation dose camera, may be used as well. Each of the cameras in the group does not need to perform a positional correction between the cameras, and the cameras are arranged independently of each other. At that time, the cameras do not need to be directed in the same direction as described above. The direction of the cameras may properly be set in the same imaging space so as to conform to a desired image. According to the present invention, a beneficial image can be taken even if the positional relationship between the cameras varies during imaging.

The image processing part 20 includes a similar component search part 210 and an image synthesis part 220.

The similar component search part 210 is configured to perform the following processes. The similar component search part 210 receives a plurality of images outputted from the group of cameras 10 and extracts respective components included in any image to be a basis image. At the same time, the similar component search part 210 temporarily stores basis component information relating to the respective components. The basis component information includes the positional coordinates, shape, size, and the like of the basis image relative to the individual components. For example, with regard to a rectangular patch as a component to be extracted, the patch range in the basis image is recorded by coordinate values. Furthermore, if object recognition is conducted along with the aforementioned extraction process, the basis component information may include the name of objects to be identified or the shape of objects. Moreover, if temperature distribution recognition or image pattern recognition is conducted, the features may be included in the basis component information so as to correspond to desired image synthesis.

Furthermore, the similar component search part 210 extracts respective components included in other images (reference images) and temporarily stores reference component information relating to the respective components. The reference component information may include the positional coordinates, shape, size, and the like of the reference image relative to the individual components. If object recognition is conducted, the reference component information may include the name of objects to be identified or the shape of objects. If temperature distribution recognition or image pattern recognition is conducted, the features may be included in the reference component information so as to correspond to desired image synthesis. The reference component information does not need to be collected in the same manner as the basis component information. It is preferable to acquire the reference component information so as to conform to images being taken. Furthermore, the reference component information may be collected based on the basis component information. Moreover a plurality of components including the same range may be extracted from the reference images.

Next, the similar component search part 210 determines whether the respective components extracted from the basis image correspond to the respective components extracted from the reference images (they can be regarded as the same or similar components). Specifically, the similar component search part 210 calculates the similarity to the components included in the reference images for each of the components included in the basis image. The similar component search part 210 performs a search process to associate similar components with each other and outputs the search result as needed. This search result also includes an image of the component extracted from the reference image that has been determined as corresponding to the component included in the basis image. It is preferable to perform a search process of similar components in real-time by the similar component search part 210 as needed, which will be described in greater detail along with examples.

The image synthesis part 220 receives the basis image and the search result and manipulates images with regard to the individual components included in the basis image while it uses, as information source, the similar components associated by the similar component search part 210. At the same time, the individual manipulated component images are subjected to a synthesis process so as to produce an output synthesis image. The manipulation of the individual components included in the basis image may include conversion into a higher resolution with high resolution imaging technology using one or more similar components as a plurality of patches or optional addition of a certain amount of a peripheral portion of the components. Furthermore, a process of determining components that will not be manipulated (will pass through the basis image) based on information used to determine the size or shape of the component relative to the entire image or specific information may be added to the above process. Moreover, a process of comparing a pre-manipulation image with a post-manipulation image for each of the components and determining whether to use an individual post-manipulation image may be added to the above process. Furthermore, a process of comparing the degree of manipulation (the degree of change) of a post-manipulation image for each of the components and determining whether to use an individual post-manipulation image may be added to the above process.

With this configuration, image synthesis can be conducted to acquire a desired image from a plurality of images acquired in a state in which the cameras have indefinite positional relationship, indefinite temporal relationship, and indefinite synchronous relationship. Therefore, a desired functional image can be synthesized, for example, with use of various types of cameras having various angles in a range that can be taken through a camera finder to acquire a basis image. Furthermore, when synthesis processes of a plurality of images acquired in the image processing part 20 are performed in parallel, a plurality of patterns of functional images with different synthesis schemes can concurrently be outputted.

[Image Processing Flow]

Next, an operation performed in the image processing part 20 will be described below.

Figure 2:
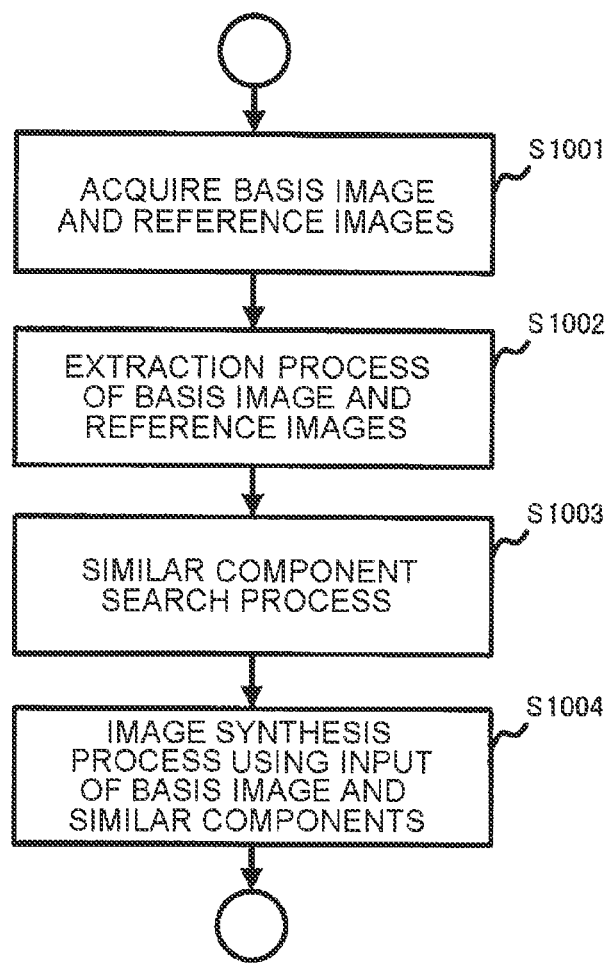
FIG. 2 is a flow chart showing a process operation performed in the multocular imaging system according to the first embodiment.

FIG. 2 shows a flow of image processing conducted in the image processing part 20 to produce a synthesis image.

The image processing part 20 acquires reference images from the group of cameras 10 along with a basis image (S1001). The acquired basis image is inputted to the similar component search part 210 and the image synthesis part 220. The reference images are inputted to the similar component search part 210.

Then the similar component search part 210 performs an extraction process of components from the basis image and the reference images, respectively (S1002). In this process, the basis image and the reference images may be processed in asynchronous manner and in parallel to each other. Furthermore, components may be extracted from the reference images so as to correspond to a component extracted from the basis image. At that time, components may be extracted from the reference images at timing in synchronism with the basis image so that the frame rate of the reference images accords with the frame rate of the basis image.

Next, the similar component search part 210 searches for a similar component included in the reference images for each of the components included in the basis image. The search result is outputted to the image synthesis part 220 (S1003). This search result includes the similar components and the similarity in association with each of the components included in the basis image. It is preferable to perform this process sequentially at a high speed in real-time.

The image synthesis part 220 receives the basis image and the search result and identifies the similar components for each of the components in the basis image. The image synthesis part 220 manipulates images with the similar components for each of the components. The manipulated components are synthesized (replaced) on the basis image to output a synthesis image (S1004). The image synthesis part 220 preferably has a configuration in which processing systems are parallelized in order to enable concurrent parallel processing for each of the components.

When the above operation is performed, image reinforcement is conducted from respective images acquired through a plurality of imaging devices with regard to a portion at which an object that is present in the basis image has been taken. A synthesis image in which the basis image has been converted into a more functional image can be produced.

Now the component extraction process will be described.
[Examples of Component Extraction Process]

For example, a rectangular patch can be used for components extracted from the basis image and the reference images, respectively. Furthermore, a object (relevant range) that can be extracted by performing specific object recognition or general object recognition for each of images may be used as one or more components. It is preferable to perform an object recognition process along with a path extraction process.

Any method may be used to acquire individual patches. For example, the entire image may equally be divided into areas having predetermined resolutions to extract a group of patches. A patch extraction process that meets certain conditions may be performed to extract a group of patches. In a patch extraction process using certain conditions, a search process is performed on, for example, a certain area in which a changing point of the contrast or the color is defined as a center point, a certain area that captures a sharp angle or a changing point of the curvature of an image, or a certain object to be searched in an image (e.g., T-lines of a face, smile lines, a person, a moving body, or the like). Then the area is divided into a plurality of areas, which are manipulated into patches. Those conditions may be determined as needed for each of applications of the system. A certain object can be searched with proper use of technology of using temporal changes of images obtained from one imaging device, technology of searching a person, or the like.

For determination of the similarity between the patches (group) extracted from the basis image and the patches (group) extracted from the reference images, SSD (Sum of Square Distance) can be used to define the dissimilarity with the sum of square of the color or brightness of each pixel. A smaller value of SSD represents that two patches are more similar to each other. Other methods may be used, or another method may be combined with SSD. When the similarity is calculated by using the respective methods, the precision of the similarity determination can be enhanced by weighing a pixel distance with respect to the center of the patch, depending upon the size of the patch. For example, when a weight is provided in inverse proportion to a distance from the center of the patch upon calculation of SSD, then the similarity determination becomes less sensitive to a small variation of the patch. Furthermore, an operation of enhancing the precision may be performed by combining absolute values of the lightness in a set of patches to be compared, providing a weight that emphasizes edges before the comparison.

Prior to those processes, the basis image and/or the reference images may be passed through a pre-filter. The pre-filter portion may be provided in the similar component search part 210 or between the reference cameras 110 and 120 and the similar component search part 210. Binarization, N-ary coding, or the like may be conducted on images prior to the patch extraction, reference images prior to the similarity determination, or the patches extracted from the reference images based upon a high-pass filter, edge extraction, or brightness to assist the similar component search. By obtaining manipulated reference patches that have passed through the pre-filter portion, the similar component search process can achieve enhanced precision, higher speed, and lower loads.

In a case where an object recognition process using feature analysis of images is solely used or combined (for example, specific object recognition for any object and simple general object recognition are used), the attributes of the extracted object (components) can be acquired. An accordance probability is calculated based on the attributes of components acquired from the basis image (extracted object) and the attributes of components acquired from the reference images (extracted object), so that accordance/discordance of the components can be determined. When components (group) acquired from the reference images are to be referred to at the time of image synthesis, the reference does not necessarily need to be made to only components that have had accordance determination. With additional reference to components that have had discordance determination, which have been determined to be another object (another individual) having high similarity, a more functional image can be synthesized. The process of determining whether or not to add a discord object having high similarity to the reference images may be provided as one setting option. Such a process may use a threshold of the similarity for determination. Components may further be extracted from an object area (components) identified for the image synthesis process. For example, components may be extracted as partial components from a person for each area around an eye, a nose, a mouth, an ear, a nameplate, and the like. A license plate or a driver (further his/her face) of a vehicle may be extracted at multiple stages. If a multiple stage configuration, such as the first stage, the second stage, . . . , and the nth stage, is used in the object recognition process, it is preferable to provide, as component information, the relationship (similarity) of components obtained by individual processes and a weight for each of the components. Furthermore, this process may be combined with a process of patch extraction for each of components obtained with a multi-stage configuration.

The aforementioned component extraction process is performed on images acquired from the respective cameras. This process may not need to be performed synchronously or with the same method. This process may be performed so as to conform to the type or the frame rate outputted from the respective cameras. Preferably, the frame rates of the respective cameras are configurable independently of each other. The similar component search part 210 may extract components by the component extraction process that conforms to the respective frame rate.

At that time, the similar component search part 210 may select an image or a group of images corresponding to the timing of acquiring the basis image from successive images acquired as the reference images and extract components from the image (or the group). A certain number of relevant images may be added to the images (reference images) corresponding to the timing of acquiring the basis image, and image synthesis may be conducted. Similar components may be extracted from the synthesized image. For example, the relevant images may include images that have been acquired in the past such as before one second, before 10 seconds, before one minute, or before one hour. An image taking a predetermined object may be used as the relevant image. For example, a vehicle with a specific shape or color, a noisy vehicle, a specific person, a specific moving body, and the like may be acquired as the relevant image.

Moreover, the number of relevant images may be set to be a predetermined value. Previous images or following images during a certain period may be used for the relevant images as needed. If the number of the following images is smaller than the interval of the component extraction process of the basis image, the real-time process may be performed. Furthermore, a similar component extraction process may be performed as a background process to be ready for ex-post replay of the synthesis images while the previous images are also considered as needed.

Furthermore, the similar component search part 210 preferably performs a component extraction process suitable for the type of each of the reference images acquired by different cameras to acquire similar components.

For example, if a plurality of reference cameras have different imaging spectral ranges as the types of images, component extraction may be conducted based on individual imaging spectral ranges. At that time, the adequateness of the component extraction is improved if the component extraction is also based on the types of cameras or the setting of the resolution.

Furthermore, the similar component search part 210 preferably has a setting option of collating the type of a component extraction process to be performed (being performed) on the basis image with a processing type of extracting a similar component from the reference images. For example, when a type of each camera is identified and a component extraction process corresponding to the type is to be performed, a component extraction process suitable for the type of the basis camera may additionally be performed for the reference images. In this case, a component that cannot be extracted from the reference images without this process is extracted as a similar component. Thus, a component that can advantageously work can be extracted. Therefore, a favorable similar component can be extracted while, for example, a difference of the imaging spectral range is absorbed. Furthermore, component that does not appear as a distinct feature that is extracted in the reference image can be extracted.

Similar components for producing a better synthesis image can be extracted by combining component extraction processes for the basis image and the reference images with each other.

The components that have been extracted are grouped into components (group) extracted from the basis image and components (group) extracted from the respective reference images to calculate the similarity between the components. The value of the similarity may be calculated from a digitized value of the similarity of images, a pro-stored similarity determination table of attributes, or the like. The components (group) of the reference images that meet a certain similarity are associated with each of the components of the basis image as similar components of the respective components. The similarity is not necessarily limited to one type. A plurality of types of the similarity based on different aspects may be used to perform the processes in parallel. Furthermore, the similarity being used may be changed with reference to basis image information (camera type, frame rate, or the like) for each of the reference images (camera types). In the subsequent synthesis process, synthesis images having different aspects can be obtained by properly changing the similarity used. In the image synthesis process, it is preferable to use an evaluation criterion of the similarity for selecting similar components used for the image synthesis. The evaluation criterion defines values of the similarity, ranges of the attributes, an allowable upper limit from the respective reference images, weights on the respective reference images (types of the cameras), or the like. In accordance with this evaluation criterion, each of the similar components is determined to be acceptable/unacceptable. The acceptable similar components (group) are used for the image synthesis.

The aforementioned processes are performed at a high speed by an LSI or a CPU. On the other hand, the processing resource is finite. Furthermore, it is not necessary to repeat the extraction of the reference image components until even a component having a low similarity is extracted. Accordingly, it is preferable to set a limitation as needed.

The amount of processing of the component extraction for the reference images can greatly be reduced by limiting the search range. On the other hand, pre-limiting the search range leads to missing a similar component that should have been extracted.

Thus, a method of adaptively changing the search range will be described below. An algorithm of collecting a number of patches from the reference images while the search range is adaptively changed in order to obtain an image subject to a super-denoising process as a strengthened image will be described by way of example.

This method adaptively changes the search range for each of the patches. When a similar patch is collected from the reference images for a certain patch extracted from the basis image, a search range is determined around the certain patch (hereinafter referred to as target patch yk). A similarity evaluation is calculated for each of the collected peaches yj. Specifically, a search range in which extraction of a similar patch is to be attempted is determined based on a portion of the reference image that is deemed to be the same as or similar to (the center of) the target peach yk extracted from the basis image. The patches yj (group) are extracted from this search range. The extracted patches yj (group) are used as a similar peach yi or selected based on the similarity. At that time, it is preferable to extract a similar patch for each of the reference images.

A similar patch may be extracted from the basis image based on the self-similarity and used along with a similar patch of the reference image at the time of the image synthesis.

Next, a similarity weight of the patch yj obtained by the search is sequentially summed up for each of the reference images. The total value Sk of the similarity weights is calculated for each of the reference images. When Sk exceeds a predetermined threshold T, the search of a similar patch for that reference image is interrupted, simplified denoising is conducted on the target patch. In this example, the patch size τ=M is used as the threshold.

Use of such an algorithm can calibrate the search range for similar patches and the number of similar patches to be extracted to the target patches yk, can reduce an operation cost, and can extract favorable similar patches yi.

The similarity weight function weighs dissimilar patches yj with small values.

However, if the number of patches weighed with a small value is large, those patches may affect estimation of the dominant structure.

Therefore, some mechanism (similarity weight function) is introduced to discard a patch yj having a low similarity and estimate the dominant structure only with yj patches having a high similarity. For this mechanism, the inventors employ the similarity weight function using a threshold.

With this similarity weight function using a threshold, the similarity weight is set to be "0" for patches other than top th patches having a large similarity weight value.

The similarity weight function using the threshold is shown below.

$$w(y_i, y_k) = \begin{cases} \exp\left(-\dfrac{\|\hat{x}_i^{prefil} - \hat{x}_k^{prefil}\|_2^2}{2 \cdot 12.75^2 \cdot M}\right) & \text{(Top } th \text{ patches with higher similarity)} \\ 0 & \text{(otherwise)} \end{cases} \quad (1)$$

$\hat{x}_i^{prefil}, \hat{x}_k^{prefil}$ ... Pre-filter patch for each patch

A pr-filter patch refers to a patch passed through a pre-filter for conducting, for example, denoising on the target patches yk or the like. Use of this similarity weight function using the threshold also allows a pre-filter patch to be used.

In a case where a group of cameras are configured so that they are arranged independently of each other as with the present invention, various mismatches are generated between taken images. If the cameras are oriented in different directions, the same object is not imaged in the first place. Furthermore, mismatches may be generated in the sampling timing.

There will be described one example of an algorithm to derive an adaptive search range (corresponding point search) for determining a patch search window while such operational flexibility is ensured.

First, a target patch extracted from the adaptive search range of the basis image under predetermined conditions is determined. A similar patch is searched from the basis image around this target patch in a certain range.

Next, a similar patch is searched from each of the reference images around a range extracted under predetermined conditions (a range corresponding to the target patch of the basis image) in the same range as that for the basis image.

In this manner similar search windows are set under the same conditions for the basis image and the reference images. This process allows the same or similar portions to be set as windows even for cameras having different fields of view. When a pre-filter process is performed beforehand, a more favorable similar patch can be obtained.

Positioning calibration using horizontal movement in the X and Y axes as in the case of the prior art may be applied to cameras that always maintain the same imaging direction and the same intervals, as a method of searching a corresponding range from each of the reference images. This positioning calibration is suitable for a case where multiple equivalent cameras are managed in a fixed manner. Calibrations for correcting a curve of an edge portion may be combined as needed. The accuracy of the calibration can be enhanced. On the other hand, each of the calibrations suffers from high cost (processing resource, time, and the like).

Meanwhile, when the above adaptive search range is used, corresponding points can be searched favorably for many cameras including a group of cameras having the same imaging direction and the same intervals.

Figure 3:
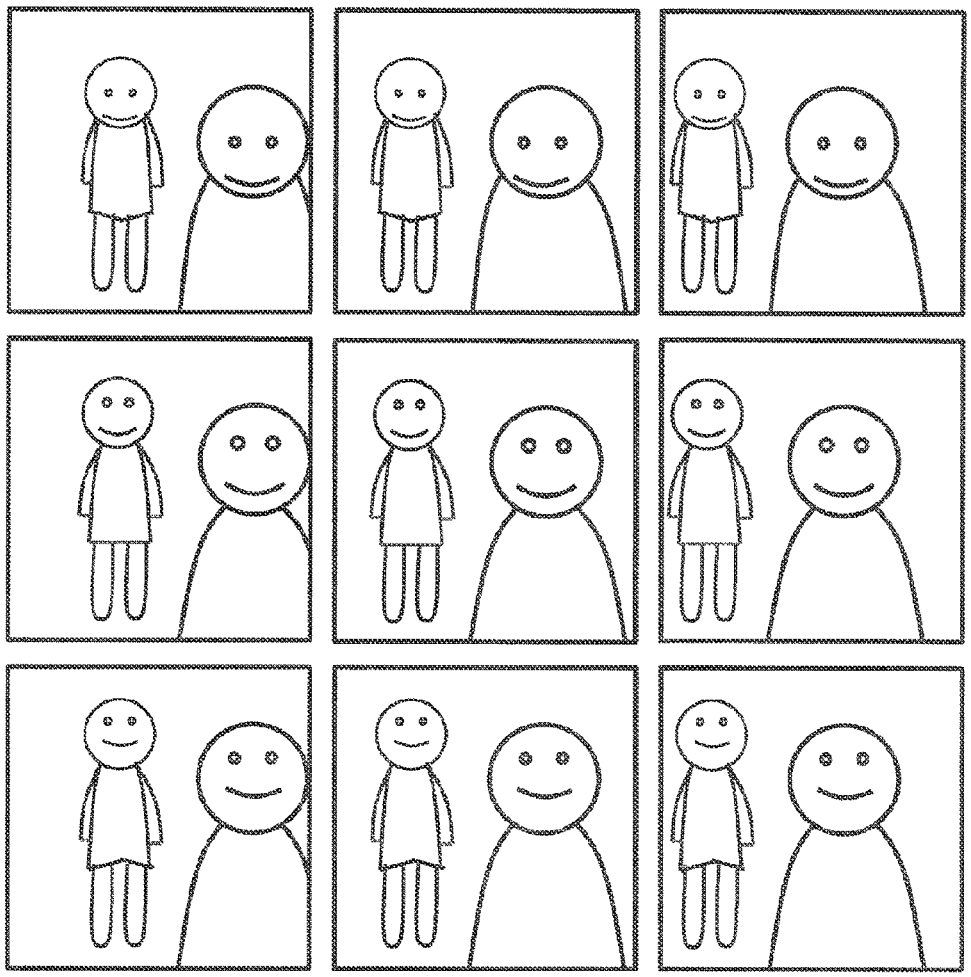
FIG. 3 is an explanatory diagram showing an example of a group of images acquired at a group of cameras used for description of the process operation.

The above method will be described with an example where the same imaging direction and the same intervals are maintained. FIG. 3 shows images acquired at nine imaging points where the same imaging direction and the same intervals are maintained. Those images are images outputted from a group of nine cameras.

One image is selected as a basis image from those images under predetermined conditions k of a target patch yk (center coordinates (Px, Py)).

Next, a range that will be deemed to be similar to the target patch yk is derived from the remaining eight images (reference images) under the predetermined conditions k. At that time, images corresponding to the same portion of the target patch yk are extracted. On the other hand, if any camera has a different imaging direction, then an image corresponding to a similar portion, rather than the same portion, is extracted. The same portion (or similar portion) is not extracted unless the predetermined conditions k are met. In this specification, a corresponding patch yic is defined as a range of a reference image that represents the same portion. Then, for each of the reference images, a similar patch is searched around the derived corresponding patch yic.

If intervals between cameras are maintained in a fixed range as described above, then a method having a less amount of processing is applicable. First, a target patch yk is extracted from the basis image under the predetermined conditions k, and a coordinate range is stored. Then a similar patch is searched within the range R with regard to the same coordinates in each of the reference images. The patch having the highest similarity among the patches collected at that time is defined as the corresponding patch yic. The center coordinates (Pxc, Pyc) of the corresponding patch yic is deemed to be a corresponding point. Next, for each of the reference images, a similar patch is searched again around the derived corresponding patch yic.

Figure 4:
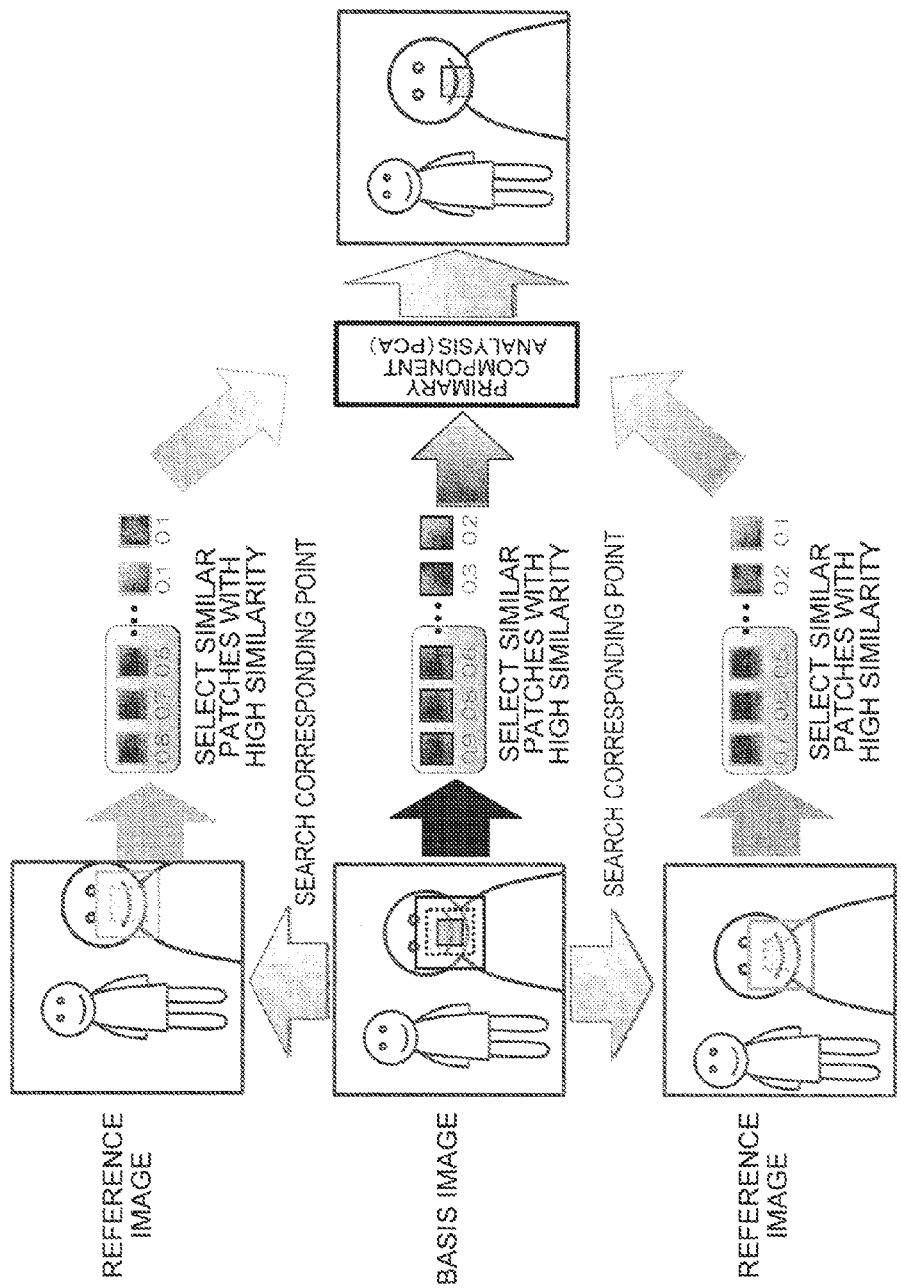
FIG. 4 is an explanatory diagram showing the concept of an algorithm of the process operation.

FIG. 4 is an explanatory diagram showing the concept of the above algorithm. FIG. 4 illustrates the concept of the component extraction for making the basis image clearer (super-denoising image synthesis process).

As marked in FIG. 4, the above algorithm allows extraction of similar patches and selection of similar patches having a high similarity from each of the basis image and the reference images, which have different fields of view than the basis image. As a result, a large number of similar patches having a high similarity can be obtained, and thus favorable image synthesis can be conducted. As shown in FIG. 4, favorable similar patches can be collected from each of the images. Therefore, a clear image of a jaw part can be obtained by the image synthesis. Furthermore, the entire image can be made clearer by repeating the same process on automatically extracted ranges or arbitrary specified ranges.

Next, several examples of the image synthesis will be described. The following examples of the image synthesis never limit the image synthesis method according to the present invention. Any desirable processing method, including selection of cameras, can be selected in order to produce a desired synthesis image with strengthened information from components included in the basis image using the corresponding similar components.

Combination Example 1

For a configuration of making an image of the basis camera clearer, a plurality of equivalent cameras are prepared as reference cameras and oriented in the same direction. A number of patches to be similar components are obtained from images that have been acquired from individual fields of view. Then a denoising process and a super-resolution process are combined with each other to produce a clear image.

Combination Example 2

For a configuration of acquiring a night-vision image with an enhanced function, a high-resolution monochrome imaging camera is properly arranged as a basis camera, and a color camera, an infrared camera, and an ultraviolet camera are properly arranged as reference cameras. Replacement components are obtained from images having various kinds of information that have been acquired from individual fields of view. Then a denoising process and a replacement process of the same portion are combined with each other to produce a desired image.

Combination Example 3

For a configuration of acquiring a high dynamic range image, a plurality of cameras having different exposure setting than that of a basis camera are properly arranged. Replacement components are obtained from images having various amounts of exposure that have been acquired from individual fields of view. Then a denoising process and a replacement process of the same portion are combined with each other to produce a desired image.

Combination Example 4

For a configuration of acquiring a multi-spectral image, a plurality of cameras that can image different spectra than that of a basis camera are properly arranged. Replacement components are obtained from various spectral images that have been acquired from individual fields of view. Then a denoising process and a replacement process of the same portion are combined with each other to produce a desired image.

Other Combination Examples

Different types of cameras or cameras having different fields of view may be combined with each other to produce an image with an emphasized outline, a multi-focus image, an image in which a person having any specific attribute is displayed in an emphasized manner, and the like.

A database prepared for a specific object (component to be extracted) may be used for a high-resolution process or the like.

Next, some other embodiments of the present invention will be described.

Second Embodiment

Figure 5:
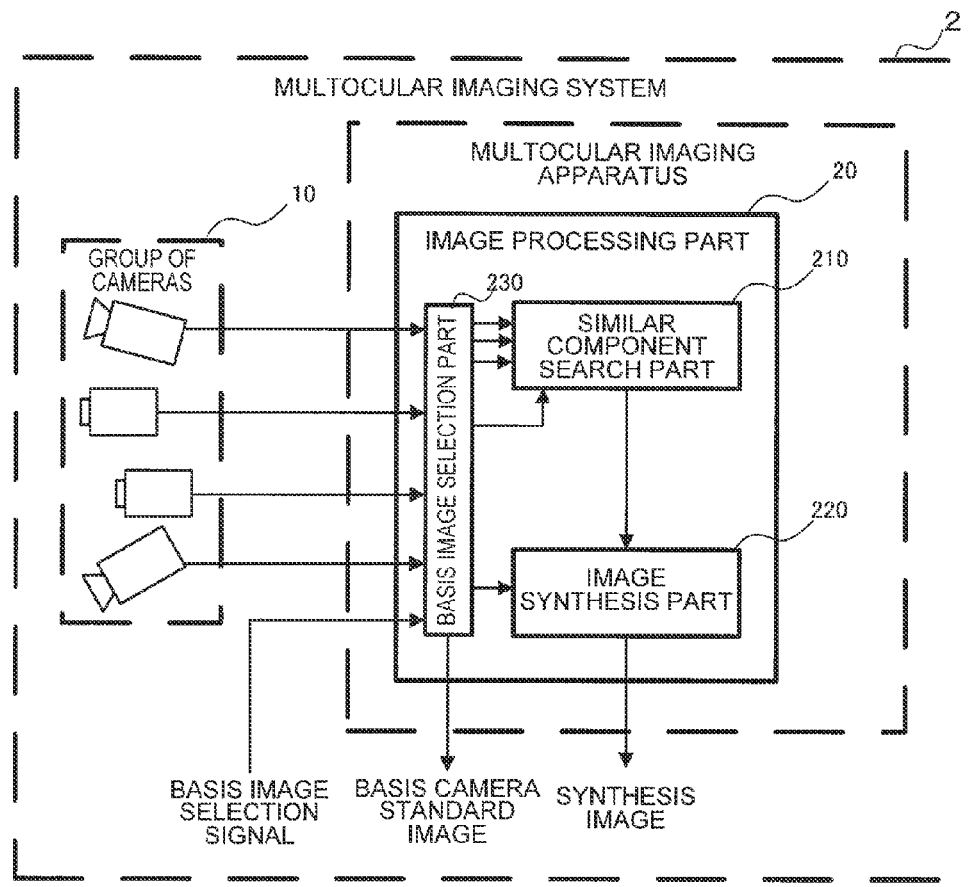
FIG. 5 is a configurational diagram showing a multocular imaging system according to a second embodiment of the present invention.

FIG. 5 is a configurational diagram showing a multocular imaging system 2 according to a second embodiment of the present invention. The explanation of similar components will be simplified or omitted.

The multocular imaging system 2 includes a group of cameras 10 and an image processing part 20. A basis image selection part 230 is added to the image processing part 20.

The basis image selection part 230 is configured to receive a basis image selection signal and switch inputs and outputs so as to use any selected camera as imaging means for acquiring a basis image and the rest of the cameras as imaging means for acquiring reference images. The basis image selection part 230 may be provided separately between the image processing part 20 and the group of cameras 10.

The basis image selection signal may be configured to be selectable via a button or a touch panel by a human, or to be received from a remote location via communication means.

The automatic process of selecting a basis image may include a mechanism of evaluating the degree of blurring or the like for each of the images and automatically selecting an image having the best evaluation value as a basis image.

For an evaluation criterion, for example, the image quality may be evaluated for each of patches to select an image having the highest average value of the image quality. Alternatively, the image quality may be evaluated for each of patches to select an image having the largest number of favorable patches or an image having the largest area. For example, evaluation of the image quality may employ dispersion of pixel values, high-frequency components, an average value of the brightness (highly ranked around a central range), and the like.

This configuration allows a basis camera to be dynamically switched based on the basis image selection signal.

Third Embodiment

Figure 6:
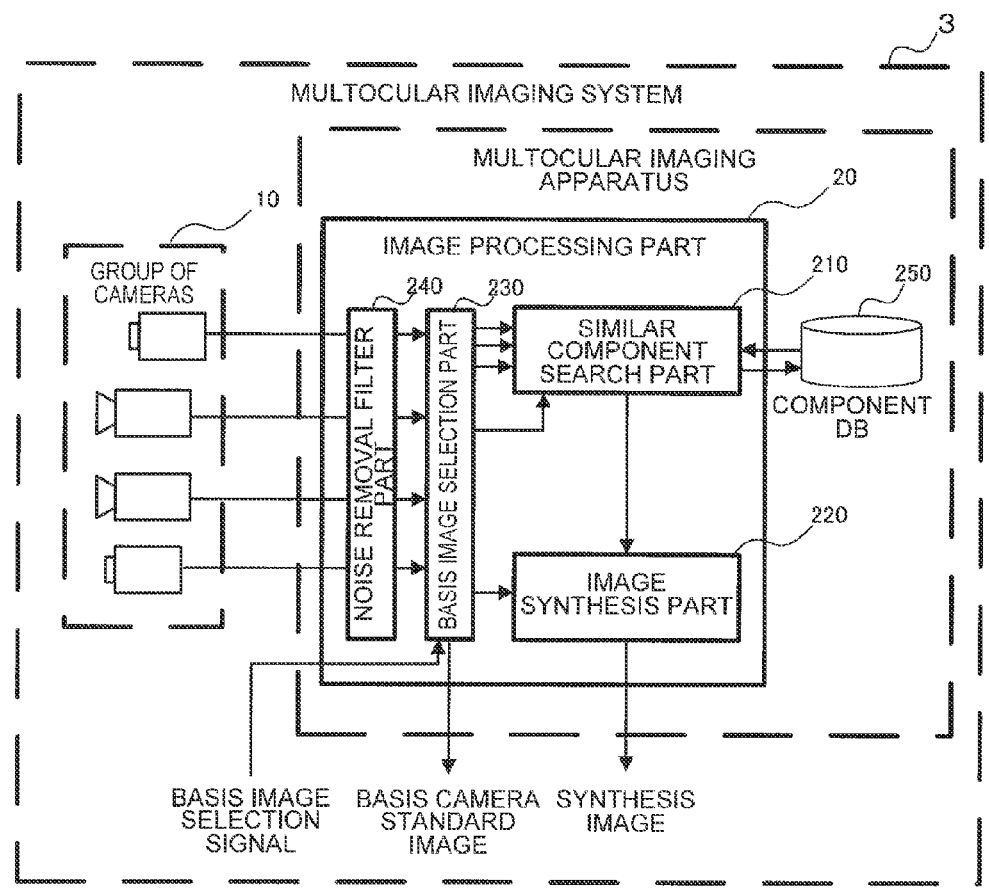
FIG. 6 is a configurational diagram showing a multocular imaging system according to a third embodiment of the present invention.

FIG. 6 is a configurational diagram showing a multocular imaging system 3 according to a third embodiment of the present invention. The explanation of similar components will be simplified or omitted.

The multocular imaging system 3 includes a group of cameras 10, an image processing part 20, a noise removal filter part 240, and a component database 250.

The noise removal filter part 240 is configured to perform a noise removal process on one or more images of the group of cameras 10.

The component database 250 stores many components extracted in past by the similar component search part 210. The component database 250 may be configured to hold a basis similar component used as a standard.

The component database 250 accepts registration of components from the similar component search part 210 and answers components being held in response to a request from the similar component search part 210. For example, the request used may include a similar component as results of the search process performed by the similar component search part 210. Furthermore, a component included in the basis image may be used for the request.

The similar component search part 210 may acquire a component that is similar to one of or both of a similar component requested for the component database 250 and a component of the basis image and notify the image synthesis part 220 of the acquired component as a search result.

The image synthesis part 220 performs a synthesis process on a component included in the basis image with use of a similar component extracted by the similar component search part and a component acquired from the component database 250.

According to this configuration, an image from which noise has been removed can be used to perform a favorable similar search process. Additionally, a large number of similar components having a high similarity can be used to provide more functional image synthesis.

Other Embodiments

Figure 7:
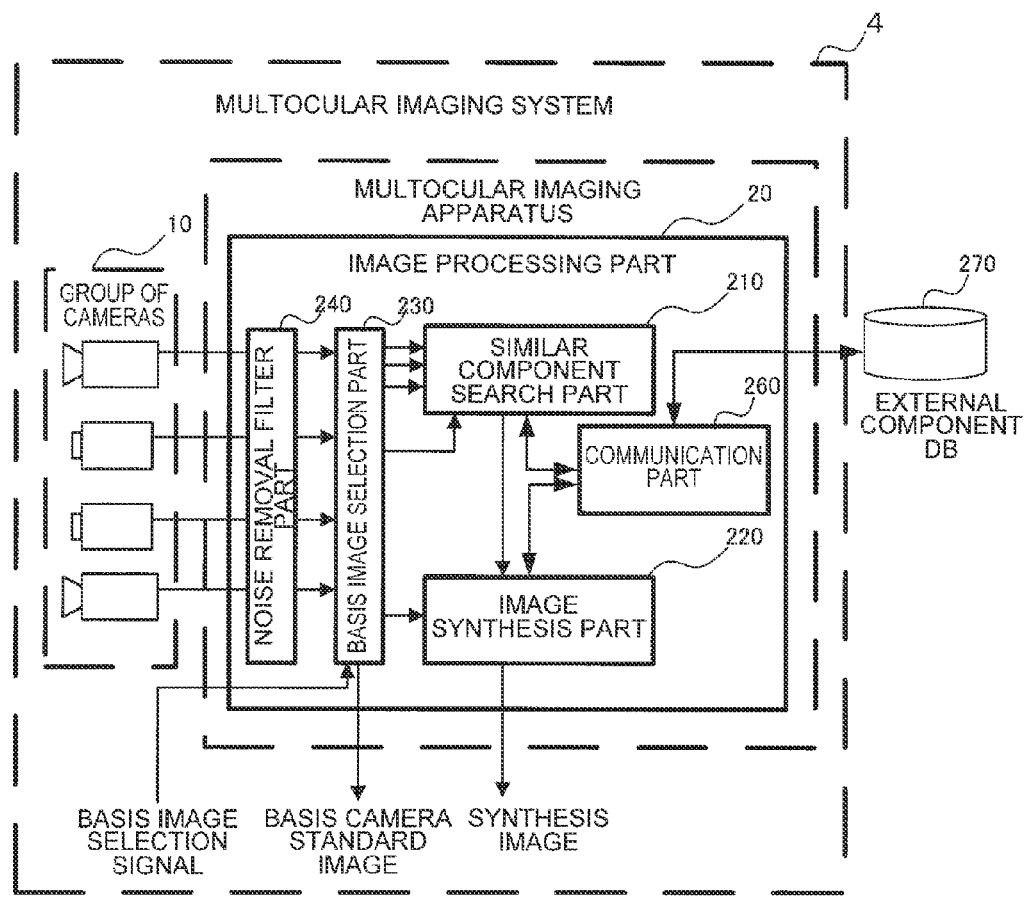
FIG. 7 is a configurational diagram showing a multocular imaging system according to another embodiment of the present invention.

Furthermore, as shown in FIG. 7, a communication part may be provided so as to use an external database. This external database stores various images or extracted components accumulated in the past. The external database can properly be used for desired purposes.

Figure 8:
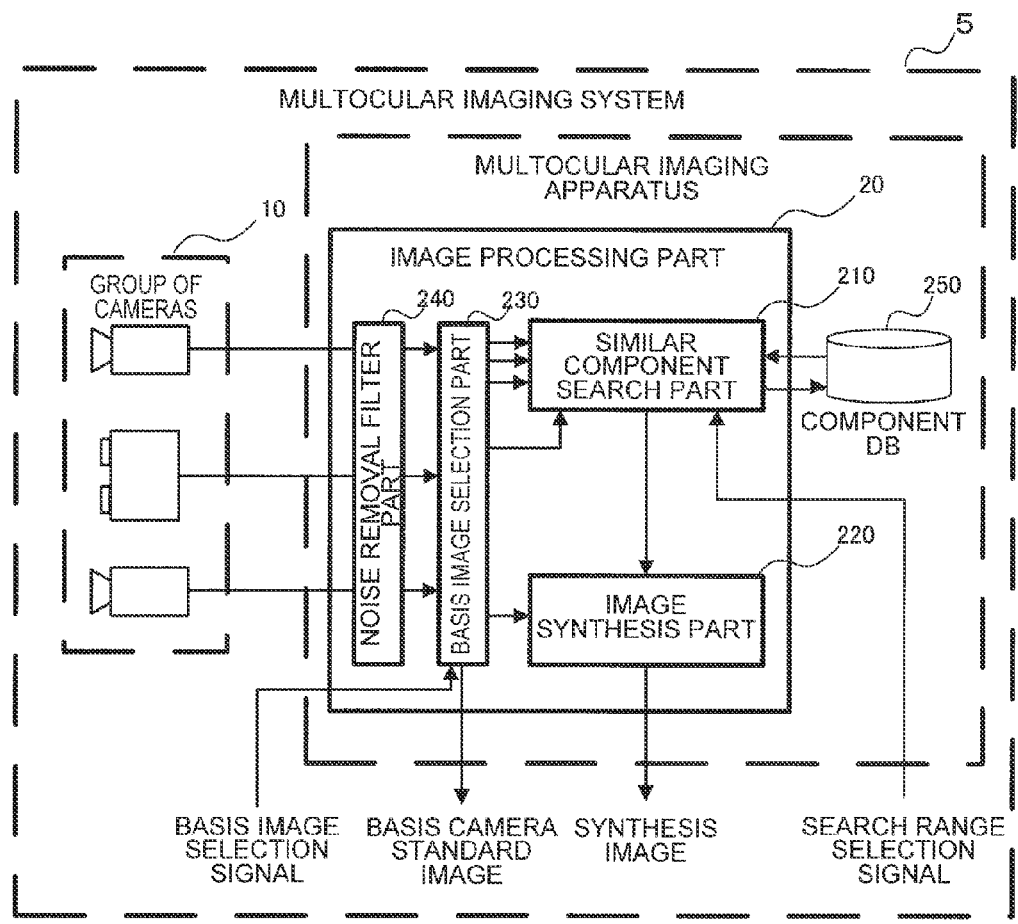
FIG. 8 is a configurational diagram showing a multocular imaging system according to another embodiment of the present invention.

Moreover, as shown in FIG. 8, a search range selection signal may be received from the exterior of the system. The image processing part may receive the specification of the search range for a basis image, reference images, or a synthesis image in response to the search range selection signal. Multiple portions, ranges, or objects may concurrently be selected. The image processing part may conduct the search in a specified image range and ranges of other corresponding images to perform a synthesis process for a desired image.

Figure 9:
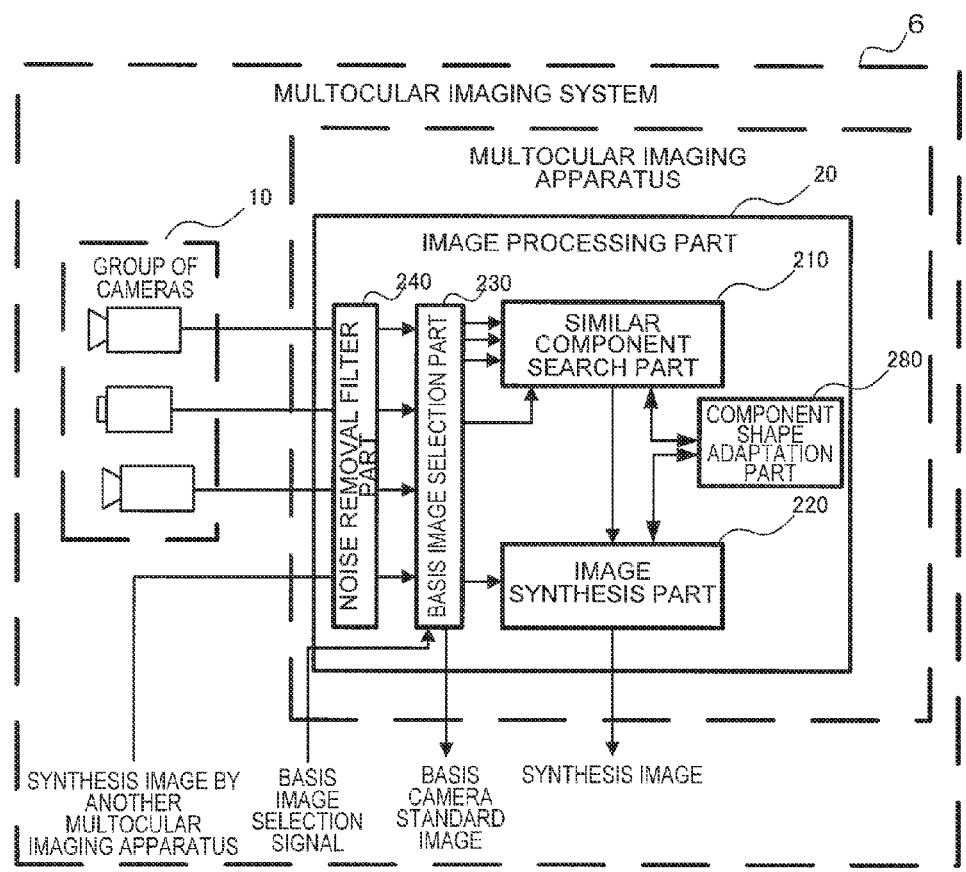
FIG. 9 is a configurational diagram showing a multocular imaging system according to another embodiment of the present invention.

Furthermore, as shown in FIG. 9, a component shape adaptation part may be provided. The component shape adaptation part may be configured to identify the same component in the basis image and/or the reference images based on image features and adaptively determine the roughness of the following component extraction process with use of the same component identified by the identification process as one criterion. Furthermore, a synthesis image that has been synthesized by another multocular imaging apparatus may be used as an input to achieve various types of image enhancement with multiple stages.

With the multocular imaging system thus configured, when required image synthesis is to be conducted with use of a plurality of imaging devices, image components (group) of target portions that can be deemed to be the same as taken in each of images by individual imaging devices arranged independently of each other can automatically be collected so as to conduct image reinforcement. At that time, the target portions that can be deemed to be the same do not need to be obtained by taking the same object. It works well if components are similar to each other. More specifically, when front and rear images of an object are taken by two cameras to obtain a clear image, similar portions of the front and rear images of the object are used to obtain a clear image of such portions. Furthermore, when a group of animals is taken from several points, an individual taken as a basis image is made clearer by using similar portions of other individuals taken by other cameras (reference images). In an example where a certain portion is displayed in an emphasized manner, a telescopic image of a highway is used as a basis image, and the estimated numbers of the license plate and the face image of the estimated driver are generated within and around a pixel range of a vehicle taken with a small figure. Furthermore, an accurate shadow of a face of a person who is in the shade (because of a hat, a light source, or the like) can be acquired as a high dynamic range synthesis image or a multi-spectral synthesis image. When the multocular imaging system performs those processes in real-time, it uses motion images as basis images and thus can output strengthened motion images in which a frame rate of the motion images of the basis images is maintained.

Specifically, according to the present invention, there can be provided a multocular imaging system that converts a basis image into a more functional image by conducting image reinforcement from image components present in each of images when a required image synthesis is conducted with a plurality of imaging devices.

Each of the parts of the multocular imaging system may be implemented by using a combination of hardware and software. In a case of hardware implementation, all or some of the parts may be arranged as a circuit on an LSI. In a case of a combination of hardware and software, an image processing program is expanded into a RAM, and hardware such as a controller (CPU) is operated based on the program to function as all or some of means. For example, one of the similar component search part and the image synthesis part may be arranged as a circuit on an LSI, and the other may be implemented by a controller that operates in accordance with a program. Furthermore, this program may be fixedly recorded and distributed on a recording medium. The program recorded on the recording medium is read into a memory via a wire, a wireless, or the recording medium itself to operate the controller and the like. Examples of the recording media include optical disks, magnetic disks, semiconductor memory devices, hard disk drives, and the like.

Specific configurations of the present invention are not limited to the aforementioned embodiments. Any modification without departing from the spirit of the present invention, such as separation or combination of the configurational blocks, exchange of the steps, and combination of the embodiments, is included in the present invention.

Some or all of the aforementioned embodiments may be described in the following supplementary notes. Nevertheless, the present invention is not limited to the following supplementary notes in any way.

[Supplementary Note 1]

A multocular imaging system characterized by comprising:

a plurality of imaging parts that can be arranged independently of each other;

a similar component search part operable to acquire a basis image outputted from at least one imaging part of the plurality of imaging parts and a reference image outputted from another imaging part of the plurality of imaging parts and to search a similar component included in the reference image for each of components included in the basis image; and an image synthesis part operable to perform a synthesis process on at least one component included in the basis image into a desired image with reference to the similar component extracted by the similar component search part and to output the desired image as a synthesis image.

[Supplementary Note 2]

The multocular imaging system as recited in the above supplementary note, characterized in that the similar component search part is operable to:

acquire a plurality of patches to be components into which each of acquired images is separated with any pixel range, as a component extraction process of extracting one or more components included in an individual image with regard to the basis image and the reference image acquired from the plurality of imaging parts, and search a similar component from the plurality of patches that have been acquired from the reference image based on a similarity of the components for each of components included in the basis image.

[Supplementary Note 3]

The multocular imaging system as recited in the above supplementary note, characterized in that:

the similar component search part is operable to perform an object recognition process using feature analysis on images to extract an object taken in the acquired image as a component in an component extraction process of extracting one or more components included in an individual image with regard to the basis image and the reference image that have been acquired from the plurality of imaging pans.

[Supplementary Note 4]

The multocular imaging system as recited in the above supplementary note, characterized in that the similar component search part is operable to perform an object recognition process using feature analysis on images to extract an object taken in the acquired image and to perform a partial recognition process and/or a patch extraction process to extract a component corresponding to part of the object in an component extraction process of extracting one or more components included in an individual image with regard to the basis image and the reference image that have been acquired from the plurality of imaging parts.

[Supplementary Note 5]

The multocular imaging system as recited in the above supplementary note, characterized in that:

the plurality of imaging parts can individually set a frame rate of an image output without a synchronization process with an image output of other imaging parts, and the similar component search part is operable to acquire the basis image and the reference image at respective frame rates of the plurality of imaging parts, to extract a component included in an individual image by a component extraction process that matches with each of the frame rates, and to search a similar component for each of components included in the basis image.

[Supplementary Note 6]

The multocular imaging system as recited in the above supplementary note, characterized in that the similar component search part is operable to select one or more images corresponding to the acquisition timing of the acquired image as the basis image from consecutive images that have been acquired as the reference image from the individual imaging parts and to perform a component extraction process on only the corresponding images to extract the similar component.

[Supplementary Note 7]

The multocular imaging system as recited in the above supplementary note, characterized in that the similar component search part is operable to select one or more images corresponding to the acquisition timing of the acquired image as the basis image from consecutive images that have been acquired as the reference image from the individual imaging parts, to add a certain number of relevant images to the corresponding images to produce a synthesis image, and to perform a component extraction process on the synthesis image to extract the similar component.

[Supplementary Note 8]

The multocular imaging system as recited in the above supplementary note, characterized in that:

the similar component search part is operable to extract a component included in an individual image with a component extraction process that matches a type of each of the reference images to search a similar component for each of components included in the basis image.

[Supplementary Note 9]

The multocular imaging system as recited in the above supplementary note, characterized in that the similar component search par is operable to use an imaging spectral range of each of the imaging parts or a type of a camera as the image type.

[Supplementary Note 10]

The multocular imaging system as recited in the above supplementary note, characterized in that the similar component search part is operable to use a resolution as the image type.

[Supplementary Note 11]

The multocular imaging system as recited in the above supplementary note, characterized in that:

the similar component search part is operable to use a component extraction process corresponding to a component extraction process to be performed on the basis image for each of the reference images to search a similar component for each of components included in the basis image.

[Supplementary Note 12]

The multocular imaging system as recited in the above supplementary note, characterized by further comprising:

a component database operable to accumulate and store components, wherein the similar component search part is operable to store the extracted component in the component database and to search, as a similar component, a component that is similar to the similar component from the component database, and the image synthesis part is operable to perform a synthesis process on at least one component included in the basis image into a desired image with reference to the similar component extracted by the similar component search part and/or the similar component acquired from the component database.

[Supplementary Note 13]

The multocular imaging system as recited in the above supplementary note, characterized by further comprising a communication part operable to communicate with an external component database for accumulating and storing a group of components in advance, wherein the similar component search part is operable to select, as a similar component, a component similar to a component acquired from the basis image and/or the reference image from the external component database, and the image synthesis part is operable to perform a synthesis process on at least one component included in the basis image into a desired image with reference to the similar component extracted by the similar component search part and/or the similar component acquired from the component external database.

[Supplementary Note 14]

The multocular imaging system as recited in the above supplementary note, characterized in that:

the image synthesis part is operable to perform a determination process of determining whether or not to use the similar component acquired from the reference image in accordance with a predetermined evaluation criterion of similarity and to perform a synthesis process on at least one component included in the basis image into a desired image with reference to the accepted similar component based on the determination process.

[Supplementary Note 15]

The multocular imaging system as recited in the above supplementary note, characterized in that:

the similar component search part is operable to receive specification of one or more image ranges with respect to the basis image, the reference image, or the synthesis image as a search range selection signal and to search a similar component included in the reference image for each of components in those ranges and within the basis image corresponding to those ranges and/or within corresponding image ranges identified as being within the reference image, and the image synthesis part is operable to perform a synthesis process on at least one component included in the corresponding image ranges of the basis image being identified into a desired image with reference to the similar component and output the desired image as a synthesis image.

[Supplementary Note 16]

The multocular imaging system as recited in the above supplementary note, characterized by further comprising:

a component shape adaptation part operable to identify the same component in the basis image and/or the reference images based on image features and to adaptively determine the roughness of the following component extraction process with use of the same component identified by the identification process as a criterion.

[Supplementary Note 17]

The multocular imaging system as recited in the above supplementary note, characterized by further comprising:

a basis image selection part operable to select any imaging part of the plurality of imaging parts as imaging means for acquiring a basis image to operate other imaging parts of the plurality of imaging parts as imaging means for acquiring a reference image.

[Supplementary Note 18]

The multocular imaging system as recited in the above supplementary note, characterized by further comprising a noise removal filter part operable to perform a noise removal process on one or all images acquired from the plurality of imaging parts.

[Supplementary Note 19]

The multocular imaging system as recited in the above supplementary note, characterized in that a motion image is acquired as the basis image, and the similar component search part and the image synthesis part are operable to synthesize the motion image into a strengthened motion image in real-time for maintaining an input frame rate of the motion image and output the strengthened motion image.

[Supplementary Note 20]

The multocular imaging system as recited in the above supplementary note, characterized in that at least one of the similar component search part and the image synthesis part is implemented by a circuit network of an LSI.

[Supplementary Note 21]

The multocular imaging system as recited in the above supplementary note, characterized in that a controller operable based on a program expanded onto a RAM is operated as at least one of the similar component search part and the image synthesis part.

[Supplementary Note 22]

A method for a synthesis process of images acquired by a plurality of imaging parts, characterized by:

acquiring a basis image and a reference image from at least one imaging part of the plurality of imaging parts that can be arranged independently of each other and another imaging part of the plurality of imaging parts;

searching a similar component included in the reference image for each of components included in the basis image;

performing a synthesis process at least one component included in the basis image into a desired image with reference to a similar component extracted by the similar component search part; and outputting the desired image subjected to the synthesis process.

[Supplementary Note 23]

The synthesis process method as recited in the above supplementary note, characterized in that:

the searching comprises:

acquiring a plurality of patches to be components into which each of acquired images is separated with any pixel range, as a component extraction process of extracting one or more components included in an individual image with regard to the basis image and the reference image acquired from the plurality of imaging parts, and searching a similar component from the plurality of patches that have been acquired from the reference image based on a similarity of the components for each of components included in the basis image.

[Supplementary Note 24]

The synthesis process method as recited in the above supplementary note, characterized in that the searching comprises performing an object recognition process using feature analysis on images to extract an object taken in the acquired image as a component in an component extraction process of extracting one or more components included in an individual image with regard to the basis image and the reference image that have been acquired from the plurality of imaging pa

[Supplementary Note 25]

The synthesis process method as recited in the above supplementary note, characterized in that the searching comprises performing an object recognition process using feature analysis on images to extract an object taken in the acquired image and performing a partial recognition process and/or a patch extraction process to extract a component corresponding to part of the object in an component extraction process of extracting one or more components included in an individual image with regard to the basis image and the reference image that have been acquired from the plurality of imaging parts.

[Supplementary Note 26]

The synthesis process method as recited in the above supplementary note, characterized in that:

the plurality of imaging parts can individually set a frame rate of an image output without a synchronization process with an image output of other imaging parts, and the searching comprises acquiring the basis image and the reference image at respective frame rates of the plurality of imaging parts, extracting a component included in an individual image by a component extraction process that matches with each of the frame rates, and searching a similar component for each of components included in the basis image.

[Supplementary Note 27]

The synthesis process method as recited in the above supplementary note, characterized in that the searching comprises selecting one or more images corresponding to the acquisition timing of the acquired image as the basis image from consecutive images that have been acquired as the reference image from the individual imaging parts and performing a component extraction process on only the corresponding images to extract the similar component.

[Supplementary Note 28]

The synthesis process method as recited in the above supplementary note, characterized in that the searching comprises selecting one or more images corresponding to the acquisition timing of the acquired image as the basis image from consecutive images that have been acquired as the reference image from the individual imaging parts, adding a certain number of relevant images to the corresponding images to produce a synthesis image, and performing a component extraction process on the synthesis image to extract the similar component.

[Supplementary Note 29]

The synthesis process method as recited in the above supplementary note, characterized in that the searching comprises extracting a component included in an individual image with a component extraction process that matches a type of each of the reference images to search a similar component for each of components included in the basis image.

[Supplementary Note 30]

The synthesis process method as recited in the above supplementary note, characterized in that the searching comprises using an imaging spectral range of each of the imaging parts or a type of a camera as the image type.

[Supplementary Note 31]

The synthesis process method as recited in the above supplementary note, characterized in that the searching comprises using a resolution as the image type.

[Supplementary Note 32]

The synthesis process method as recited in the above supplementary note, characterized in that the searching comprises using a component extraction process corresponding to a component extraction process to be performed on the basis image for each of the reference images to search a similar component for each of components included in the basis image.

[Supplementary Note 33]

The synthesis process method as recited in the above supplementary note, characterized by further comprising a component database operable to accumulate and store components, wherein the searching comprises storing the extracted component in the component database and searching, as a similar component, a component that is similar to the similar component from the component database, and the synthesis process comprises performing a synthesis process on at least one component included in the basis image into a desired image with reference to the similar component extracted by the similar component search part and/or the similar component acquired from the component database.

[Supplementary Note 34]

The synthesis process method as recited in the above supplementary note, characterized by further comprising a communication part operable to communicate with an external component database for accumulating and storing a group of components in advance, wherein the searching comprises selecting, as a similar component, a component similar to a component acquired from the basis image and/or the reference image from the external component database, and the synthesis process comprises performing a synthesis process on at least one component included in the basis image into a desired image with reference to the similar component extracted by the similar component search part and/or the similar component acquired from the component external database.

[Supplementary Note 35]

The synthesis process method as recited in the above supplementary note, characterized in that the synthesis process comprises performing a determination process of determining whether or not to use the similar component acquired from the reference image in accordance with a predetermined evaluation criterion of similarity and performing a synthesis process on at least one component included in the basis image into a desired image with reference to the accepted similar component based on the determination process.

[Supplementary Note 36]

The synthesis process method as recited in the above supplementary note, characterized in that the searching comprises receiving specification of one or more image ranges with respect to the basis image, the reference image, or the synthesis image as a search range selection signal and searching a similar component included in the reference image for each of components in those ranges and within the basis image corresponding to those ranges and/or within corresponding image ranges identified as being within the reference image, and the synthesis process comprises performing a synthesis process on at least one component included in the corresponding image ranges of the basis image being identified into a desired image with reference to the similar component and outputting the desired image as a synthesis image.

[Supplementary Note 37]

The synthesis process method as recited in the above supplementary note, characterized by further comprising identifying the same component in the basis image and/or the reference images based on image features and adaptively determining the roughness of the following component extraction process with use of the same component identified by the identification process as a criterion.

[Supplementary Note 38]

The synthesis process method as recited in the above supplementary note, characterized by further comprising selecting any imaging pert of the plurality of imaging parts as imaging means for acquiring a basis image to operate other imaging parts of the plurality of imaging parts as imaging means for acquiring a reference image.

[Supplementary Note 39]

The multocular imaging system as recited in the above supplementary note, characterized by further comprising performing a noise removal process on one or all images acquired from the plurality of imaging parts before the search process.

[Supplementary Note 40]

The multocular imaging system as recited in the above supplementary note, characterized in that a motion image is acquired as the basis image, and the search process and the synthesis process comprise synthesizing the motion image into a strengthened motion image in real-time for maintaining an input frame rate of the motion image and outputting the strengthened motion image.

[Supplementary Note 41]

The multocular imaging system as recited in the above supplementary note, characterized in that at least one of the search process and the synthesis process is performed by a circuit network of an LSI.

[Supplementary Note 42]

The multocular imaging system as recited in the above supplementary note, characterized in that at least one of the search process and the synthesis process is performed by operating a controller operable based on a program expanded onto a RAM.

[Supplementary Note 43]

A non-transitory computer-readable storage medium storing a program characterized by operating a controller of an information processing apparatus that receives an output from a plurality of imaging parts to:

acquire a basis image outputted from at least one imaging part of the plurality of imaging parts and a reference image outputted from another imaging part of the plurality of imaging parts;

search a similar component included in the reference image for each of components included in the basis image; and perform a synthesis process on at least one component included in the basis image into a desired image with reference to a similar component extracted by the similar component search part and output the desired image as a synthesis image.

[Supplementary Note 44]

A non-transitory computer-readable storage medium storing a program characterized by operating a controller of an information processing apparatus that receives an output from a plurality of imaging parts to:

acquire a basis image outputted from at least one imaging part of the plurality of imaging parts and a reference image outputted from another imaging part of the plurality of imaging parts;

search a similar component included in the reference image for each of components included in the basis image; and transmit the search result to an image synthesis part implemented by an LSI.

[Supplementary Note 45]

A non-transitory computer-readable storage medium storing a program characterized by operating a controller of an information processing apparatus to receive the search result from a similar component search part implemented by an LSI, to perform a synthesis process on at least one component included in the basis image into a desired image with reference to the similar component extracted by the similar component search part, and to output the desired image as a synthesis image.

[Supplementary Note 46]

The non-transitory computer-readable storage medium storing a program as recited in the above supplementary note, characterized by operating the similar component search part to:

acquire a plurality of patches to be components into which each of acquired images is separated with any pixel range, as a component extraction process of extracting one or more components included in an individual image with regard to the basis image and the reference image acquired from the plurality of imaging parts, and search a similar component from the plurality of patches that have been acquired from the reference image based on a similarity of the components for each of components included in the basis image.

[Supplementary Note 47]

The non-transitory computer-readable storage medium storing a program as recited in the above supplementary note, characterized by operating the similar component search part to:

perform an object recognition process using feature analysis on images to extract an object taken in the acquired image as a component in an component extraction process of extracting one or more components included in an individual image with regard to the basis image and the reference image that have been acquired from the plurality of imaging parts.

[Supplementary Note 48]

The non-transitory computer-readable storage medium storing a program as recited in the above supplementary note, characterized by operating the similar component search part to perform an object recognition process using feature analysis on images to extract an object taken in the acquired image and perform a partial recognition process and/or a patch extraction process to extract a component corresponding to part of the object in an component extraction process of extracting one or more components included in an individual image with regard to the basis image and the reference image that have been acquired from the plurality of imaging parts.

[Supplementary Note 49]

The non-transitory computer-readable storage medium storing a program as recited in the above supplementary note, characterized by receiving an output from the plurality of imaging parts in which a frame rate of an image output is individually set, and operating the similar component search part to acquire the basis image and the reference image at respective frame rates of the plurality of imaging parts, extract a component included in an individual image by a component extraction process that matches with each of the frame rates, and search a similar component for each of components included in the basis image.

[Supplementary Note 50]

The non-transitory computer-readable storage medium storing a program as recited in the above supplementary note, characterized by operating the similar component search part to select one or more images corresponding to the acquisition timing of the acquired image as the basis image from consecutive images that have been acquired as the reference image from the individual imaging parts and perform a component extraction process on only the corresponding images to extract the similar component.

[Supplementary Note 51]

The non-transitory computer-readable storage medium storing a program as recited in the above supplementary note, characterized by operating the similar component search part to select one or more images corresponding to the acquisition timing of the acquired image as the basis image from consecutive images that have been acquired as the reference image from the individual imaging parts, add a certain number of relevant images to the corresponding images to produce a synthesis image, and perform a component extraction process on the synthesis image to extract the similar component.

[Supplementary Note 52]

The non-transitory computer-readable storage medium storing a program as recited in the above supplementary note, characterized by operating the similar component to extract a component included in an individual image with a component extraction process that matches a type of each of the reference images to search a similar component for each of components included in the basis image.

[Supplementary Note 53]

The non-transitory computer-readable storage medium storing a program as recited in the above supplementary note, characterized by operating the similar component search part to change a process operation so as to correspond to an imaging spectral range of each of the imaging parts or a type of a camera as the image type.

[Supplementary Note 54]

The non-transitory computer-readable storage medium storing a program as recited in the above supplementary note, characterized by operating the similar component search part to change a process operation so as to correspond to a resolution as the image type.

[Supplementary Note 55]

The non-transitory computer-readable storage medium storing a program as recited in the above supplementary note, characterized by operating the similar component search part to use a component extraction process corresponding to a component extraction process to be performed on the basis image for each of the reference images to search a similar component for each of components included in the basis image.

[Supplementary Note 56]

The non-transitory computer-readable storage medium storing a program as recited in the above supplementary note, characterized by:

using a component database operable to accumulate and store components;

operating the similar component search part to store the extracted component in the component database and search, as a similar component, a component that is similar to the similar component from the component database; and operating the image synthesis part to perform a synthesis process on at least one component included in the basis image into a desired image with reference to the similar component extracted by the similar component search part and/or the similar component acquired from the component database.

[Supplementary Note 57]

The non-transitory computer-readable storage medium storing a program as recited in the above supplementary note, characterized by:

using a communication part operable to communicate with an external component database for accumulating and storing a group of components in advance;

operating the similar component search part to select, as a similar component, a component similar to a component acquired from the basis image and/or the reference image from the external component database; and operating the image synthesis part to perform a synthesis process on at least one component included in the basis image into a desired image with reference to the similar component extracted by the similar component search part and/or the similar component acquired from the component external database.

[Supplementary Note 58]

The non-transitory computer-readable storage medium storing a program as recited in the above supplementary note, characterized by:

operating the image synthesis part to perform a determination process of determining whether or not to use the similar component acquired from the reference image in accordance with a predetermined evaluation criterion of similarity and to perform a synthesis process on at least one component included in the basis image into a desired image with reference to the accepted similar component based on the determination process.

[Supplementary Note 59]

The non-transitory computer-readable storage medium storing a program as recited in the above supplementary note, characterized by:

operating the similar component search part to receive specification of one or more image ranges with respect to the basis image, the reference image, or the synthesis image as a search range selection signal and search a similar component included in the reference image for each of components in those ranges and within the basis image corresponding to those ranges and/or within corresponding image ranges identified as being within the reference image; and operating the image synthesis part to perform a synthesis process on at least one component included in the corresponding image ranges of the basis image being identified into a desired image with reference to the similar component and output the desired image as a synthesis image.

[Supplementary Note 60]

The non-transitory computer-readable storage medium storing a program as recited in the above supplementary note, characterized by:

further operating the controller as a component shape adaptation part operable to identify the same component in the basis image and/or the reference images based on image features and adaptively determine the roughness of the following component extraction process with use of the same component identified by the identification process as a criterion.

[Supplementary Note 61]

The non-transitory computer-readable storage medium storing a program as recited in the above supplementary note, characterized by:

further operating the controller as a basis image selection part operable to select any imaging part of the plurality of imaging parts as imaging means for acquiring a basis image to operate other imaging parts of the plurality of imaging parts as imaging means for acquiring a reference image.

[Supplementary Note 62]

The non-transitory computer-readable storage medium storing a program as recited in the above supplementary note, characterized by:

further operating the controller as a noise removal filter part operable to perform a noise removal process on one or all images acquired from the plurality of imaging parts.

[Supplementary Note 63]

The non-transitory computer-readable storage medium storing a program as recited in the above supplementary note, characterized by:

acquiring a motion image as the basis image, and operating the similar component search part and the image synthesis part to synthesize the motion image into a strengthened motion image in real-time for maintaining an input frame rate of the motion image and output the strengthened motion image.

DESCRIPTION OF REFERENCE NUMERALS AND SIGNS

1, 2, 3, 4, 5, 6 multocular imaging system
10 group of cameras (a plurality of imaging parts, a plurality of imaging means)
20 multocular imaging apparatus
210 similar component search part
220 image synthesis part
230 basis image selection part
240 noise removal filter part
250 component database
260 communication part
270 component external database
280 component shape adaptation part This application claims the benefit of priority from Japanese patent application No. 2013-112453, filed on May 29, 2013, the disclosure of which is incorporated herein in its entirety by reference.

The invention claimed is:

1. A multocular imaging system comprising:
a plurality of imaging parts that can be arranged independently of each other; and
a controller configured to:
acquire a basis image outputted from at least one imaging part of the plurality of imaging parts and a reference image outputted from another imaging part of the plurality of imaging parts and search a similar component included in the reference image for each of components included in the basis image while a search range is adaptively changed; and
perform a synthesis process on at least one component included in the basis image into a desired image with reference to the similar component and to output the desired image as a synthesis image.

2. The multocular imaging system as recited in claim 1, wherein:
the controller is further configured to:
acquire a plurality of patches to be components into which each of acquired images is separated with any pixel range, as a component extraction process of extracting one or more components included in an individual image with regard to the basis image and the reference image acquired from the plurality of imaging parts, and search the similar component from the plurality of patches that have been acquired from the reference image based on a similarity of the components for each of components included in the basis image.

3. The multocular imaging system as recited in claim 1, wherein:
the controller is further configured to extract a component included in an individual image with a component extraction process that matches a type of each of the reference images to search the similar component for each of components included in the basis image.

4. The multocular imaging system as recited in claim 1, wherein:
the controller is further configured to use a component extraction process corresponding to a component extraction process to be performed on the basis image for each of the reference images to search the similar component for each of components included in the basis image.

5. The multocular imaging system as recited in claim 1, further comprising:
a component database configured to accumulate and store components,
wherein the controller is configured to store the extracted component in the component database and to search, as a similar component, a component that is similar to the similar component from the component database, and
perform a synthesis process on at least one component included in the basis image into a desired image with reference to the similar component extracted by the similar component search part and the similar component acquired from the component database.

6. The multocular imaging system as recited in claim 1, wherein:
the controller is further configured to perform a determination process of determining whether or not to use the similar component acquired from the reference image in accordance with a predetermined evaluation criterion of similarity and to perform a synthesis process on at least one component included in the basis image into a desired image with reference to the accepted similar component based on the determination process.

7. The multocular imaging system as recited in claim 1, wherein the controller is further configured to:
select any imaging part of the plurality of imaging parts as imaging unit for acquiring a basis image to operate other imaging parts of the plurality of imaging parts as imaging unit for acquiring a reference image.

8. The multocular imaging system as recited in claim 1, wherein the controller is further configured to perform a pre-filtering process on at least one of the basis image and the reference image after obtaining the basis image and the reference image and search the similar component included in the reference image for each of components included in the basis image with reference to the basis image and the reference image including an image subjected to the pre-filtering process.

9. The multocular imaging system as recited in claim 1, wherein the controller is further configured to perform a pre-filtering process on at least one patch extracted from the basis image and the reference image after the acquiring basis image and the reference image and to search a similar patch included in the reference image for each of the patches included in the basis image with reference to the patch subjected to the pre-filtering process.

10. The multocular imaging system as recited in claim 1, wherein:
the controller is further configured to:
select the similar component with use of a similarity weight function having a threshold to set a small similarity weight for extracted components other than a predetermined number of top extracted components having a large similarity weight before using a similar component included in the reference image for the image synthesis process, and
perform an image synthesis on at least one component included in the basis image with reference to the selected similar component.

11. The multocular imaging system as recited in claim 1, wherein the controller is operable based on a program expanded onto a random access memory (RAM).

12. A method for a synthesis process of images acquired by a plurality of imaging parts, comprising:
acquiring a basis image and a reference image from at least one imaging part of the plurality of imaging parts that can be arranged independently of each other and another imaging part of the plurality of imaging parts;
searching a similar component included in the reference image for each of components included in the basis image while a search range is adaptively changed;
performing a synthesis process on at least one component included in the basis image into a desired image with reference to a similar component extracted by the similar component search part; and
outputting the desired image subjected to the synthesis process.

13. A non-transitory computer-readable storage medium storing a program operating a controller of an information processing apparatus that receives an output from a plurality of imaging parts to:
acquire a basis image outputted from at least one imaging part of the plurality of imaging parts and a reference image outputted from another imaging part of the plurality of imaging parts;
search a similar component included in the reference image for each of components included in the basis image while a search range is adaptively changed; and
perform a synthesis process on at least one component included in the basis image into a desired image with reference to a similar component extracted by the similar component search part and output the desired image as a synthesis image.

14. A non-transitory computer-readable storage medium storing a program operating a controller of an information processing apparatus that receives an output from a plurality of imaging parts to:
acquire a basis image outputted from at least one imaging part of the plurality of imaging parts and a reference image outputted from another imaging part of the plurality of imaging parts;
search a similar component included in the reference image for each of components included in the basis image while a search range is adaptively changed; and
transmit at least one component included in the basis image, wherein a synthesis process is performed on at least one component included in the basis image into a desired image with reference to a similar component and the desired image is output as a synthesis image.

15. A non-transitory computer-readable storage medium storing a program operating a controller of an information processing apparatus to:
receive a search result, wherein the controller is connected to a plurality of imaging parts that can be arranged independently of each other, acquires a basis image outputted from at least one imaging part of the plurality of imaging parts and a reference image outputted from another imaging part of the plurality of imaging parts, and searches a similar component included in the reference image for each of components included in the basis image while a search range is adaptively changed; and perform a synthesis process on at least one component included in the basis image into a desired image with reference to a similar component and output the desired image as a synthesis image.

\* \* \* \* \*